United States Patent [19]

Basavanhally

[11] Patent Number: 5,346,583
[45] Date of Patent: Sep. 13, 1994

[54] OPTICAL FIBER ALIGNMENT TECHNIQUES

[75] Inventor: Nagesh R. Basavanhally, Trenton, N.J.

[73] Assignee: AT&T Bell Laboratories, Murray Hill, N.J.

[21] Appl. No.: 115,083

[22] Filed: Sep. 2, 1993

[51] Int. Cl.⁵ .................... B32B 31/00; C03C 27/00
[52] U.S. Cl. .................... 156/629; 156/64; 156/273.3; 156/275.5; 156/293; 430/321; 430/323; 430/946
[58] Field of Search .......... 430/321, 946, 323; 156/275.5, 644, 64, 293, 273.3, 629

[56] References Cited

U.S. PATENT DOCUMENTS

| | | | |
|---|---|---|---|
| 4,074,933 | 2/1978 | Yevick | 353/27 R |
| 4,528,260 | 7/1985 | Kane | 430/946 |
| 4,689,291 | 8/1987 | Popovic et al. | 430/321 |
| 4,835,078 | 5/1989 | Harvey et al. | 430/22 |
| 5,073,003 | 12/1991 | Clark | 385/33 |
| 5,079,130 | 1/1992 | Derkits, Jr. | 430/321 |
| 5,135,590 | 8/1992 | Basavanhally et al. | 156/64 |
| 5,216,543 | 6/1993 | Calhoun | 430/946 |
| 5,286,338 | 2/1994 | Feldblum et al. | 156/643 |

*Primary Examiner*—Chester T. Barry
*Attorney, Agent, or Firm*—Roderick B. Anderson

[57] ABSTRACT

A substrate (10) is formed having first and second opposite flat surfaces. Photolithographic masking and etching is used to form on the first surface of the substrate at least one lens (25) having a central axis. Photolithographic masking and etching is also used to form on the second surface of the substrate an optical fiber guide (23). The fiber guide is then used to mount an optical fiber(27) on the second surface of the substrate such that the central axis of the optical fiber is substantially coincident with the central axis of the lens, thereby giving the desired alignment.

8 Claims, 1 Drawing Sheet

U.S. Patent    Sep. 13, 1994    5,346,583
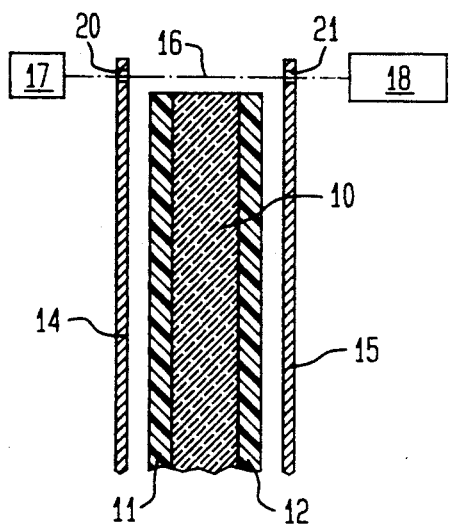
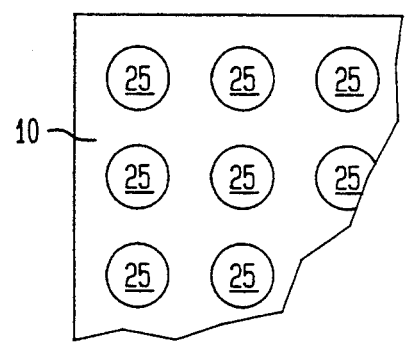
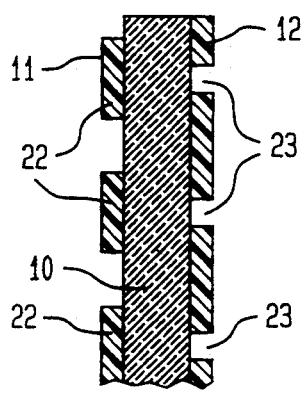
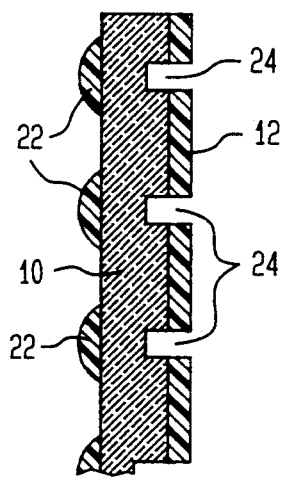
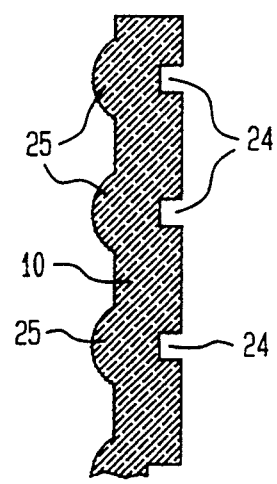
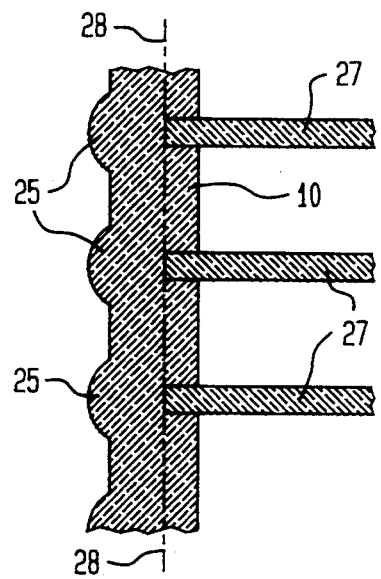
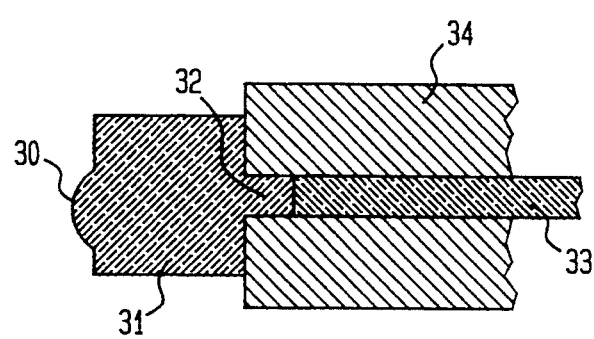

OPTICAL FIBER ALIGNMENT TECHNIQUES

TECHNICAL FIELD

This invention relates to optical fiber alignment techniques and, more particularly, to methods for aligning optical fibers with microlenses.

BACKGROUND OF THE INVENTION

The copending application of A. Y. Feldblum et al. Ser. No. 08/024035, filed Mar. 1, 1993, now U.S. Pat. No. 5,286,338, hereby incorporated herein by reference, describes methods for making a microlens array on one flat surface of a silica substrate. The application points out that such arrays are useful, for example, for coupling light to and from optical fiber bundles of the type described in the Basavanhally, U.S. Pat. No. 5,135,590, granted Aug. 4, 1992.

According to the method, a matrix array of photoresist elements are defined on a silica substrate by photolithographic masking and etching. The photoresist elements are then melted to cause them to have curved or dome-shaped upper surfaces, and are thereafter solidified. The photoresist elements and the substrate are next subjected to reactive ion etching, that is, etching by a reactive gas in which the reaction is enhanced by applied radio frequency power. The photoresist elements cause differential etching in the substrate such that, after all of the photoresist has been etched away, the dome shapes of the original photoresist elements are replicated in the silica substrate.

After a microlens array has been made, I have found that it is difficult to align it with an optical fiber bundle such that each microlens is precisely properly aligned with the end of an optical fiber. Another problem is that, if the substrate thickness must always be smaller than the separation of the lens from the fiber, the substrate may be made so thin as to make the microlens array extremely fragile. Aligning optical fibers with lenses is also a problem in other photonics packages, such as those in which a laser, lens and fiber must be aligned, or in a detector in which a photodetector, lens and optical fiber must be mutually aligned.

SUMMARY OF THE INVENTION

In one embodiment of the invention, a substrate is formed having first and second opposite flat surfaces. Photolithographic masking and etching is used to form on the first surface of the substrate at least one lens having a central axis. Photolithographic masking and etching is also used to form on the second surface of the substrate an optical fiber guide. The fiber guide is then used to mount an optical fiber on the second surface of the substrate such that the central axis of the optical fiber is substantially coincident with the central axis of the lens, thereby giving the desired alignment.

The optical fiber guide may, for example, be an aperture in the second surface of the substrate into which an optical fiber can snugly fit to give the desired alignment. The lens and the aperture may each be one of a matching matrix array. The mask used for masking and etching the first and second flat surfaces can be aligned by using a light beam so that the array of lenses on the first flat surface is aligned after etching with the array of apertures on the second flat surface. One fiber of a bundle is mounted in each aperture, thereby aligning the bundle of fibers with the microlens array. These and other objects, features and benefits of the invention will be better understood from a consideration of the following detailed description taken in conjunction with the accompany drawing.

BRIEF DESCRIPTION OF THE DRAWING

FIGS. 1, 2, 3 and 4 illustrate schematically successive steps in making a microlens array in accordance with an illustrative embodiment of the invention;

FIG. 5 is a front view of the microlens array of FIG. 4;

FIG. 6 is a schematic view of a microlens array of the type made by the process of FIGS. 1 through 4 with an array of optical fibers mounted therein; and FIG. 7 is a schematic view of an optical device in accordance with another embodiment of the invention.

DETAILED DESCRIPTION

The drawings are intended to be schematic; they are not necessarily to scale, and in some cases are distorted to aid in clarity of exposition. FIGS. 1–4 are side sectional views showing successive stages in the fabrication of a microlens array in accordance with an illustrative embodiment of the invention, while FIG. 5 is a fragmentary front view of the microlens array of FIG. 4. Referring now to FIG. 1, there is shown a light transmissive substrate 10, preferably of silicon or glass, covered on opposite sides with photoresist layers 11 and 12. A mask 14 is used for defining a pattern in photoresist layer 11, while a mask 15 is used to define a pattern on photoresist layer 12. The configuration of the pattern of mask 14 is intended to be registered with that of mask 15, and, for this purpose, a light beam 16 is directed from a light source 17 toward a photodetector 18. As is described in detail in the patent of Harvey et al., U.S. Pat. No. 4,835,078, granted May 30, 1989, incorporated herein by reference, by providing an appropriate zone plate 20 in mask 14 and a slot 21 in mask 15, one can use the light beam 16 to align the masks 14 and 15 with respect to each other and consequently with respect to the glass substrate 10. As described in the Harvey et al. patent, light beam 16 is preferably only one of three light beams used for alignment.

As will be seen later, it is intended that mask 14 define a microlens array on one side of the substrate 10, and that mask 15 define an array of apertures, each for holding an optical fiber in alignment with an opposite microlens. Light is directed through photomasks 14 and 15 to expose layers 11 and 12 selectively to permit patterns to be formed in the photoresist. It should be noted that the sequence of steps need not necessarily be that which is described; rather, processing of one side of the substrate 10 to follow complete processing of the other side is normally preferred.

Referring to FIG. 2, development of the photoresist 11 yields an array of circular or cylindrical elements 22 having the general shape of the lenses to be defined. Development of photoresist layer 12 yields an array of circular apertures 23, each aligned with the central axis of one of the elements 22.

Referring to FIG. 3, the photoresist 12 acts as an etch mask to permit apertures 24 to be selectively etched into the substrate 10, the apertures 24 corresponding in location to the apertures 23 of FIG. 2. The photoresist elements 22 on the opposite surface of substrate 10 are heated to their reflow temperature so as to form a meniscus which, by surface tension, causes each element 22 to assume a dome shape. It may be desirable that during this step, the substrate 10 be oriented in a horizontal position with the photoresist elements 22 on the top side so as to prevent any sagging due to gravity. Depending on the size of the elements and the nature of the photoresist used, this may not be necessary. As is described in more detail in the aforementioned Feldblum et al. application, after heating to form the meniscus, the photoresist elements 22 are allowed to cool so that they constitute hard spherical elements on the surface of substrate 10.

Referring to FIG. 4, the surface of the substrate 10 containing the photoresist elements 22 is subjected to reactive ion etching, which causes etching of the substrate 10 that is partially masked by photoresist elements 22 of FIG. 3. When the photoresist elements 22 have been completely etched away, the differential etching of the substrate 10 yields a plurality of microlenses 25 on the surface of the glass substrate 10. FIG. 5 is a front view showing the microlenses 25 arranged in a regular matrix configuration.

As is described in the aforementioned Basavanhally patent, it is important for some purposes that the ends of the optical fibers of a bundle be arranged in a regular matrix configuration. Thus, referring to FIG. 6, insertion of an optical fiber 27 into each of the apertures 24 of FIG. 4 allows the ends of the fibers 27 to be arranged in a matrix configuration on a common plane 28. Each of the optical fibers 27 is centered on a separate microlens 25. By designing the microlenses 25 and the apertures 24 of FIG. 4 appropriately, one can assure that plane 28 lies on the focal points of each of the microlenses 25, as is sometimes desired for maximum light coupling by a microlens into an optical fiber 27.

An advantage of the FIG. 5 structure is that the distance between the microlens array 25 and the ends of fibers 27 may be smaller than the thickness of the substrate. As a consequence, the substrate 10 can be sufficiently thick to be mechanically robust and reliable. Another advantage of course is that the optical fibers 27 are each aligned on the central axis of a corresponding microlens 25; this alignment was assured by the alignment of the masks in FIG. 1. This avoids the need for complex structures to align the ends of an optical fiber bundle with the component microlenses of a microlens array, as would normally be required.

As was mentioned in the Basavanhally patent, the optical fibers 27 may each have a diameter of one hundred twenty-five microns with a center-to-center spacing of successive fiber ends of two hundred sixty-two microns. With a silicon substrate 10, the substrate thickness may be two millimeters and the focal length of each microlens may be 1.85 millimeters at 1.3 microns wavelength of infrared light. The plastic photoresist elements 22 of FIG. 3 may themselves be used as lenses if made of a material that is appropriately transmissive of the light beam used, as is known in the art. The apertures 24 of FIG. 4 may each have a diameter at the bottom of one hundred twenty-seven microns, which may be made by reactive ion etching with a fair degree of accuracy. It is preferred that the diameter of the surface end of each aperture 24 be one hundred thirty millimeters, which allows for tapering of the aperture for easier reception of the optical fiber. After the fibers have been inserted in the apertures, they may be held in place by epoxy, as is known in the art.

It is clear from the foregoing that the invention can be used for aligning a single optical fiber 27 with a single microlens 25, as well as being used for microlens arrays. In this case, only a single aperture 24 would be made at a location corresponding to the central axis of the corresponding microlens. Moreover, rather than an aperture, other forms of optical fiber guiding means may be defined by masking and etching the side of the substrate opposite the microlens.

FIG. 7 shows another embodiment in which a single microlens 30 has been formed on one side of a glass substrate 31, and a cylindrical alignment pin 32 has been formed by masking and etching on the opposite surface of substrate 31. The alignment pin 32 is preferably made by masking and etching using a mask that has been aligned with the mask used for forming microlens 30, as discussed above. The alignment pin may have approximately the same diameter as an optical fiber to be aligned with the microlens. An optical fiber 33 to be aligned is surrounded by an annular rigid ferrule 34, which has been made to overlap slightly one end of the optical fiber 33. This overlapping forms a cylindrical aperture into which cylindrical alignment pin 32 can be inserted as shown. Thus, the end of the optical fiber 33 is placed snugly against a surface of substrate 31 for optimum optical coupling with microlens 30, and may be permanently fixed by epoxy. The interface of the optical fiber 33 and the substrate 31 may be located at the focal point of lens 30 for optimizing optical coupling. Ferrule 34 may be of ceramic or metal, as is known in the art.

An advantage of this embodiment is that is makes use of the optical fiber ferrule which is normally used for packaging purposes to strengthen and protect the fiber. Thus, the embodiment is particularly useful in a laser source package in which a laser, a lens and a fiber must be mutually aligned, and in a detector package in which a fiber, lens and photodetector must be properly aligned for maximum efficiency of optical transmission to the photodetector. Alternatively, of course, an aperture may be used to mount the optical fiber for use in such devices, as discussed above.

The various embodiments described are only illustrative of the inventive concept. For example, the substrates can be made of various light transmissive materials other than silicon, silica or glass; such materials include various light transmissive polymers. Various other embodiments and modifications may be made by those skilled in the art without departing from the spirit and scope of the invention.

I claim:

1. A method for making optical devices comprising the steps of:
    forming of a light transmissive material a substrate having first and second opposite surface;
    forming on the first surface of the substrate at least one lens having a central axis comprising the step of defining the lens by photolithographic masking and etching;
    the lens having a focal point that lies between the first and second surfaces of the substrate;
    forming on the second surface by photolithographic masking and etching an aperture extending into the substrate, the aperture having a diameter approximately equal to the diameter of an optical fiber;
    mounting the optical fiber on the second surface of the substrate by fitting one end of the optical fiber snugly within the aperture such that the central axis of the optical fiber is substantially coincident with the central axis of the lens;

the aperture extending from the second surface of the substrate to said focal point, whereby the lens is capable of focusing light onto the mounted optical fiber.

2. The method of claim 1 further comprising the steps of:

using a first mask to define at least one lens region on the first side of the substrate;

using a second mask to define at least one optical fiber guide region on the second surface of the substrate;

and using a light beam directed through portions of both the first and second masks to align the first and second masks.

3. The method of claim 1 wherein:

the step of forming the lens comprises the step of forming a matrix array of microlenses;

the step of forming the aperture comprises the step of forming a matrix array of apertures, each aperture having a central axis substantially coincident with the central axis of a corresponding microlens;

and the mounting step comprises the step of mounting an optical fiber into each of the apertures.

4. The method of claim 3 wherein:

each of the microlens has a focal point, all of the focal points lying substantially on a common plane;

and the optical fibers are mounted such that one end of each fiber substantially lies on said common plane.

5. A method for making optical devices comprising the steps of:

forming of a light transmissive material a substrate having first and second opposite flat surfaces;

forming on the first surface of the substrate at least one lens having a central axis comprising the step of defining the lens by photolithographic masking and etching;

forming on the second surface of the substrate an alignment pin extending from the substrate comprising the step of defining the alignment pin by photolithographic masking and etching;

and mounting the optical fiber on the second surface of the substrate comprising the step of mounting the optical fiber within a ferrule having a central opening, and projecting the alignment pin into the central opening of the ferrule.

6. The method of claim 5 wherein:

the alignment pin is a cylindrical portion having approximately the same diameter as that of the optical fiber.

7. The method of claim 5 wherein:

the lens has a focal point;

and the optical fiber is mounted such that one end thereof is substantially perpendicular to the central axis and is substantially coincident with said focal point.

8. The method of claim 5 further characterized by the steps of:

using a first mask to define at least one lens region on the first side of the substrate;

using a second mask to define at least one optical fiber guide region on the second surface of the substrate;

and using the aligned position of the first mask with respect to the first surface to aid in aligning the second mask with the second surface.

* * * * *

UNITED STATES PATENT AND TRADEMARK OFFICE
CERTIFICATE OF CORRECTION

PATENT NO.   : 5,346,583
DATED        : September 13, 1994
INVENTOR(S)  : N. R. Basavanhally It is certified that error appears in the above-indentified patent and that said Letters Patent is hereby corrected as shown below:

Column 6, line 24, "5" should read --1--.

Signed and Sealed this

Third Day of January, 1995

Attest:

BRUCE LEHMAN

Attesting Officer    Commissioner of Patents and Trademarks